United States Patent [19]
Deckwer et al.

[11] Patent Number: 6,150,490
[45] Date of Patent: Nov. 21, 2000

[54] BIOLOGICALLY DEGRADABLE POLYESTER, MATERIALS MADE FROM THE POLYESTER AND PRODUCTION PROCESS

[75] Inventors: Wolf-Dieter Deckwer; Rolf Joachim Müller; Uwe Witt, all of Braunschweig; Hans-Jürgen Arning, Lübbecke, all of Germany

[73] Assignee: Degussa-Huels AG, Marl, Germany

[21] Appl. No.: 09/043,011

[22] PCT Filed: Sep. 4, 1996

[86] PCT No.: PCT/EP96/03879

§ 371 Date: Aug. 14, 1998

§ 102(e) Date: Aug. 14, 1998

[87] PCT Pub. No.: WO97/09364

PCT Pub. Date: Mar. 13, 1997

[30] Foreign Application Priority Data

Sep. 5, 1995 [DE] Germany .................. 195 32 771

[51] Int. Cl.[7] .................................................. C08G 18/34
[52] U.S. Cl. ........................... 528/80; 528/272; 528/288; 528/302
[58] Field of Search .............................. 528/80, 272, 288, 528/302

[56] References Cited

U.S. PATENT DOCUMENTS

| 3,763,079 | 10/1973 | Fryd . |
| 4,328,059 | 5/1982 | Horlbeck et al. . |
| 4,704,445 | 11/1987 | Komiya et al. . |
| 5,310,782 | 5/1994 | Takiyama et al. . |

FOREIGN PATENT DOCUMENTS

| 824723 | 10/1969 | Canada . |
| 0 007 445 | 2/1980 | European Pat. Off. . |
| 0 028 687 | 5/1981 | European Pat. Off. . |
| 751857 | 7/1956 | United Kingdom . |
| 1 253 632 | 11/1971 | United Kingdom . |

OTHER PUBLICATIONS

Josef Augusta et al., "A Rapid Evaluation Plate–Test For The Biodegradability of Plastics", Applied Microbiology and Biotechnology, Springer–Verlag (1994) pp. 673–678.

Uwe Witt et al., "Synthesis, Properties and iodegradability of Polyesters Based on 1,3–Propanediol", Macromol. Chem. Phys. 195, 793–802 (1994).

*Primary Examiner*—John M. Cooney, Jr.
*Attorney, Agent, or Firm*—Brooks & Kushman P.C.

[57] ABSTRACT

The invention concerns biologically degradable polyesterS which are degraded under the action of micro-organisms in the natural environment. Said polyesters are high molecular weight satistical copolyesters which are made using an aliphatic polyalcohol, an aromatic polycarboxylic acid and also an aliphatic polycarboxylic acid as monomer components. They contain constitutional repeating or recurrent units comprising (i) a polyalcohol and an aromatic polycarboxylic acid and (ii) a polyalcohol and an aliphatic polycarboxylic acid, where over 90% of the units of type (i) are directly bonded with none or at most one other unit of type (i). The polyesters are produced by using a di-isocyanate as an additional monomer component, less isocyanate being used than any of the other monomer components. The present invention also concerns materials made from said biodegradable polyester and a process for producing said polyesters.

29 Claims, No Drawings

BIOLOGICALLY DEGRADABLE POLYESTER, MATERIALS MADE FROM THE POLYESTER AND PRODUCTION PROCESS

TECHNICAL FIELD

The invention relates to biodegradable copolyesters of aliphatic and aromatic dicarboxylic acids with high molecular weights (in particular in the form of a material or substance to be processed further) and materials consisting of the polyester and a method of production.

DESCRIPTION OF THE RELATED ART

In view of the increasingly problematic waste situation, thermoformable polymeric materials have been developed in recent years which can be decomposed biologically by microorganisms. Although initial batches of mixtures of conventional olefinic polymers with starch (Krupp et al in Environ. Sci. Technol., 26 (1992) 193–1981) exhibited good application properties, they proved to be only partially degradable since only the starch content was metabolised by microorganisms. Biodegradable materials which are obtained directly or after suitable modification (Utz et al., Untersuchungen zum Einsatz bioabbaubarer Kunststoffe im Verpackungsbereich—investigations on the use of biodegradable plastics in the packaging sector (1991), ), BMFT research report no. 01-zv 8904) from biogenic polymers are usually fully biodegradable but frequently exhibit serious drawbacks with respect to processing and use. Plasticised starch materials, for example, are thus not resistant to water. However, the limited variability and reproducibility of the material properties must, above all, be regarded as major disadvantages of such natural materials.

A solution to these problems can be achieved by using synthetic polymers. In this respect, polymers exhibiting hetero atoms in their main chain have, in general, proved to be potentially biodegradable. It is known that aliphatic polyesters, in particular, are metabolised by microorganisms within relatively short periods of time (Witt et al. in Makromol. Chem. Phys., 195 (1194) 793–802); however, such polyesters frequently exhibit only moderate thermal and mechanical properties. The aliphatic polyester polycaprolactone, for example, has a melting point of only approximately 60° C., making it unsuitable for various applications. It is known that an improvement in the mechanical processing and application properties of polyesters and polyamides can be achieved by increasing the molecular weight by coupling them with diisocyanates, bisoxiranes or peroxides (DE A 1 495 714.3, DE A 2 011 678.3). Such a modified aliphatic polyester which is referred to as being biodegradable, is described in EP A 0 572 256. In the case of this material, diisocyanates have been added in quantities of 0.1 to 5%. The thermal properties of the aliphatic polyester, however, remain largely unaffected by such a modification. Apart from such polyesters, the use of aliphatic polyester urethanes containing up to 25% urethane segments, as biodegradable substances, is also described (EP A 0 593 975).

It is also known that the material properties of aliphatic polyesters can be improved dramatically if part of the aliphatic dicarboxylic acid is substituted by aromatic carboxylic acids. A copolyester based on 1,4-butane diol and terephthalic acid is thus described (EP A 0 007 445), 10 to 30 mole % of the terephthalic acid being replaced by a mixture of adipic acid, glutaric acid and succinic acid. These mixed polymers are processed into moulded parts by injection moulding or extrusion, but are not biodegradable. Aliphatic/aromatic copolyesters with terephthalic acid contents of 40 to 85 mole % have not been described as materials for further processing but for use as melt adhesives or coating agents in powder form (EP A 0 028 687), the biodegradability not being discussed in further detail.

In German patent application (1) 95 08 737.2 it was shown that it is possible to produce random copolyesters from aliphatic dicarboxylic acids and terephthalic acid and various aliphatic dicarboxylic acids and terephthalic acid as well as various aliphatic diols, which copolyesters exhibit satisfactory processing and application properties and, on the other hand, are biodegradable. An essential structural criterion of these materials consists in that the proportion of vicinal dicarboxylic acid units is kept small in order to guarantee the biodegradability of the copolyesters. These copolyesters produced by conventional melt condensation can be processed into moulded parts by extrusion.

However, substantially higher melt viscosities are required for numerous other processing methods, e.g. the manufacture of blown films and blow moulded parts (Yokota et al in Doi & Fukuda (editors), Biodegradable Plastics and Polymers, Elsevier, New York, 1994). High melt viscosities require a high molecular weight of the copolyesters. Basically, this is achieved by increasing the molecular weight of the copolyesters by raising the temperature, further reducing the pressure and substantially longer reaction times during polycondensation. For industrial purposes, this process is not practicable because of the long reaction times and the thermal stress on the materials, in particular for copolyesters.

The task leading to the present invention consisted of developing a material for further processing which exhibits both good processing and application characteristics and can be simultaneously degraded by ubiquitous microorganisms.

The task on which the invention is based is achieved by biodegradable polyesters (in particular in the form of a material or substance to be processed further) which are degraded in a natural environment under the influence of microorganisms and which are high molecular random copolyesters produced by means of an aliphatic polyol, an aromatic polycarboxylic acid and, simultaneously, an aliphatic polycarboxylic acid as monomer components and exhibit constitutional repeating units or recurring units which consist (i) on the one hand, of polyol and aromatic polycarboxylic acid and
(ii) on the other hand, of polyol and aliphatic polycarboxylic acid more than 90% of the units according to (i) being directly coupled with no or with a maximum of one further unit according to (i), characterised in that the polyesters have been produced by using a diisocyanate as additional monomer component, the isocyanate being used in a smaller quantity compared with that of each of the other monomer components.

Surprisingly enough, it was possible to achieve an increase in the molecular weight also in the case of the polyesters according to the invention with a complex structure by adding bifunctional isocyanates such that substantially improved processing properties, for example for blow moulding processes, and material properties can be achieved. In addition, it was found that, in spite of the resulting very high molecular weight of the polyesters according to the invention, the materials can be degraded by microorganisms.

DETAILED DESCRIPTION OF THE INVENTION

The polyesters according to the invention can be produced by adding, after the condensation of the aliphatic/aromatic copolyesters, 0.1 to 5% by weight and in particular 0.5 to 2% by weight of bifunctional isocyanates, based on the polyester, e.g. to the melt.

Suitable diisocyanates are aliphatic, cycloaliphatic or aromatic diisocyanates, in particular hexamethylene diisocyanate.

The polyester according to the invention may have a content, based on the aromatic polycarboxylic acid as monomer component, of 3 to 65 and in particular 35 to 55 mole % (based on the total acid in the form of monomer components). This characteristic is advantageous for the biodegradability.

The polyester according to the invention may have been produced by the polyester being precondensed with an aliphatic diol, in particular $C_{2-6}$-diol, preferably 1,2-ethane diol, 1,2-propane diol, 1,3-propane diol, 1,4-butane diol, 2,3-butane diol or 1,6 hexane diol an aromatic dicarboxylic acid, preferably terephthalic acid and an aliphatic dicarboxylic acid, in particular $C_{2-10}$ dicarboxylic acid, preferably adipic acid or sebacic acid and additionally postcondensed or polymerised with a diisocyanate.

The polyester according to the invention may be producible by condensing the polyester by means of aromatic dicarboxylic acids and/or aliphatic dicarboxylic acids in the form of their methyl esters.

To improve the hydrolytic stability it is possible to add the additives commonly used in industry, e.g., phosphorus compounds, to the polycondensate; regarding the state of the art, compare EP A 0 572 256, for example.

The polyester according the invention can be produced by (i) condensing polyol, aromatic polycarboxylic acid and aliphatic polycarboxylic acid in the melt to form a preliminary product and subsequently (ii) condensing the preliminary product with diisocyanate to form the end product. As regards stage (i), reference can be made to German patent application (1) 95 08 737.2.

In this connection, it is possible to condense with excess polyol in stage (i).

It is also possible to proceed in such a way that (a) the diisocyanate is added to the melt or (b) the melt and the diisocyanate are introduced into a separate reactor and condensed therein to form the end product.

In stage (i) it is possible to condense to form a preliminary product with molecular weights of 5,000 to 60,000 g/mole and preferably 20,000 to 50,000 g/mole. It is also possible to condense in stage (ii) to form an end product with molecular weights of 60,000 to 350,000 g/mole and in particular 100,000 to 250,000 g/mole.

Polyesters according to the invention may be characterised by melting points of 40 to 155° C. and in particular 90 to 155° C.

Polyesters according to the invention may be characterised by high melt viscosities.

In general, it can be said that an essential advantage of the polyesters according to the invention consists in that the thermal properties, the processing and mechanical properties and the rate of biodegradation can be adjusted within wide limits to suit the application concerned. This flexibility is guaranteed by possible variation of the monomer components and their proportions and of the parameters mentioned above.

The polyesters according to the invention differ from those of German patent application (1) 95 08 737.2 in that they are precondensed polyesters. As regards the biodegradability of the polyesters according to the invention, reference can be made to the above-mentioned German patent application. Surprisingly enough, the person skilled in the art has found that, in spite of the dramatic increase in the molecular weight of the polyesters according to the invention, it is possible to guarantee biodegradability by microorganisms by coupling by means of diisocyanates. If polyester according to the invention in powder form is placed on an agar plate with a complex medium and inoculated with a microorganism consortium capable of biodegrading polyesters according to German patent application (1) 95 08 737.2 (pre-polyesters), clearly visible haloes are formed around the microorganism colonies also in the case of the polyesters according to the invention, e.g. at an incubation temperature of 55° C., within 7 days; regarding the degradation test, compare Augusta et al. in Appl. Microbiol. Biotechol., 39 (1993) 673–678. Moreover, definite losses of weight can be observed in the case of the polyesters according to the invention within a few weeks on films compression moulded in the melt if they are inoculated on an agar plate with the microorganisms mentioned above or introduced into a compost material.

According to a further embodiment, the present invention relates to a material consisting of a biodegradable polyester according to the invention in the form of flat material, in particular films composite materials laminates single filaments, filamentous materials or fibres or moulded parts, preferably injection moulded, extruded or foamed moulded parts, in particular blown films, extruded films, coextruded films, blow-moulded bodies, thermoformed bodies, foamed bodies or monofilamentous materials.

Polyesters according to the invention can be processed, for example by thermoplastic processes such as compression moulding, extrusion, coextrusion, injection moulding, melt spinning, thermoforming, foaming or blow moulding into flat material, e.g. films, or into moulded parts or, by suitable methods, into foamed moulded parts, laminates, filamentous materials, fibres or composite materials.

Since the polyesters according to the invention are chain-extended polymers which have substantially higher melt viscosities compared with the non-chain-extended copolyesters of the art, the polyesters according to the invention are suitable in particular for processing methods for which high melt viscosities are desirable, e.g. for blow moulding processes.

Materials according to the invention may have a high mechanical strength. This mechanical strength can be increased by stretching at temperatures below the melting point.

It is possible to admix common inorganic or organic fillers not negatively affecting biodegradation to the material according to the invention, preferably silica gel, titanium dioxide, talcum, starch and/or cellulose.

As regards applications of the material according to the invention, reference should be made to the content as a whole of German patent application (1) 95 08 737.2. Further applications relate to films or bags for domestic purposes or refuse. In addition, applications are possible which require high melt viscosities or a high mechanical strength.

According to a further embodiment, the invention finally relates to a process for the production of biodegradable polyesters which are degraded in a natural environment under the influence of microorganisms and which are high molecular random copolyesters produced by means of an aliphatic polyol, an aromatic polycarboxylic acid and, simultaneously, an aliphatic polycarboxylic acid as monomer components and exhibit constitutional repeating units or recurring units which consist (i) on the one hand, of polyol and aromatic polycarboxylic acid and (ii) on the other hand, of polyol and aliphatic polycarboxylic acid, more than 90% of the units according to (i) being directly coupled with no or with maximum one further unit according to (i), characterised in that (i) polyol, aromatic carboxylic acid and aliphatic polycarboxylic acid are condensed in the melt to form a preliminary product and subsequently (ii) the preliminary product is condensed with a diisocyanate as additional monomer component to form the end product, the diisocyanate being used in a smaller quantity compared with that of each of the other monomer components.

The invention will be explained in further detail below by way of methods of measurement used and examples.

Determination of the Molecular Weight by GPC

| | |
|---|---|
| Pump: | Gynkotek, model 300C |
| Detector: | SDK Shodex RI SE-51 |
| Column: | PL gel, $10^4$ Å, 7.5 × 300 mm |
| Calibration: | PS - Standards PL-Laboratories; molecular weight 23000–990000 g/mole |
| Solvent: | Chloroform |
| Flow rate 1 ml/min | |
| Polymer concentration: | 1 mg/ml |
| Injection volume: | 50 µl |

DSC Measurements

| | |
|---|---|
| Equipment: | Mettler DSC 12 |
| Amount weighed in: | 5–10 mg |
| Temperature range: | 20–200° C. |
| Rate of heating: | 10° C./min |

Clear Zone Test

| Medium: | |
|---|---|
| $NH_4NO_3$ | 1.0 g |
| $MgSO_4 * 7H_2O$ | 0.5 g |
| NaCl | 0.5 g |
| $FeSO_4 * 7H_2O$ | 0.01 g |
| $K_2HPO_4$ | 1.0 g |
| Agar | 20.0 g | make up with distilled water to 1000 ml.

Using 20 ml medium respectively, agar plates are prepared according to common sterile methods.

Polymer: The polymer concerned is dissolved to form a 1% solution in chloroform and sprayed with a fine nozzle in the form of fine particles onto the agar plate. To remove the chloroform, the plate is left to stand without a cover for some time under the clean bench.

Organism: Isolat (CH2/5) from an enriched culture with non-chain-extended degradable copolymers from compost at 60° C.

Method: The organism is transferred from an agar plate with non-chain-extended copolyester with an inoculation loop in dot form onto the agar plate holding the material to be tested and incubated at 55° C. The formation of haloes around the organism cultures, in which polymer material is no longer recognisable, is characterised by an average halo diameter.

Biodegradation of Films

By compression moulding of the melt, films of a thickness of 120 µm (diameter 2.5 cm) are produced from the materials according to the invention. The films are subjected to a biological charge as follows:

Film/plate test:
The films are placed onto an agar plate with the synthetic mineral medium described above or a complex medium of a compost eluate. The inoculation takes place before placing the films by spreading the screened microorganism consortia onto the agar plate. The incubation temperature is 55° C. The weight loss of the films in percent is determined.

Composting test:
The films are introduced into a reactor filled with fully ripened compost material (60% humidity) and externally thermostated at 60° C. (to allow a better relocation of the fragments, the films are enclosed in polyethylene nets). The reactor is aerated during the period of the test with pre-thermostated and steam-saturated air. The weight loss of the films is determined in percent.

Determination of the Melt Viscosity by Measuring the MFI

| | |
|---|---|
| Equipment: | Zwick flow test device 4105 |
| Measuring load: | 2.16–21.6 kg |
| Measuring temperature: | 150–220° C. |

Determination of the Tensile Strength and the Elongation at Break

| | |
|---|---|
| Equipment: | Zwick universal test machine 1425 |
| Size of the film strips: | 50 × 15 mm |
| Rate of take-off: | 500 mm/min |

EXAMPLE 1

Synthesis of poly[(tetramethylene hexane dioate)-co-(tetramethylene terephthalate)]

358.3 g 1,4-butane diol, 308.9 g dimethyl terephthalate (DMT), 348.7 g adipic acid, 0.25 g tetraisopropyl orthotitanate and 0.25 g triphenyl phosphate are polycondensed by condensation in the melt. A 2 liter plane joint reactor with a vacuum agitator system, a nitrogen feed and a condenser is used as polycondensation vessel. The reactor is flushed out with nitrogen, the mixture is melted at 150° C. and condensed with stirring at 190° C. in the steam of nitrogen. Subsequently, the pressure is gradually reduced to approximately 0.1 hPa and the base powder is condensed to a molecular weight of 50,000 g/mole while being monitored by GPC. The vacuum is released and 0.5 g phosphorous acid is stirred into the melt. Subsequently, 15 g hexamethylene diisocyanate are added directly to the melt at 200° C. with stirring. Within a few minutes, a substantial increase in the viscosity of the melt takes place. The copolyester is subsequently discharged, cooled and granulated.

A white flexible material with a weight average molecular weight of 168500 g/mole and a melting point of 109° C. is obtained. Films of this material produced by extrusion typically exhibit tensile strength values of 12 N/mm$^2$ and an elongation at break of 900%.

EXAMPLE 2

Synthesis of poly[(tetramethylene hexane diol)-co-(tetramethylene terephthalate)]

35.83 g 1.4-butane diol, 30.89 g dimethyl terephthalate (DMT), 34.87 g adipic acid and 0.025 g tetraisopropyl orthotitanate and 0.0.25 g triphenyl phosphate are condensed as in example 1 to a molecular weight of 48,000 g/mole. A 250 ml three-necked flask is used as the polymerisation reactor. After adding 0.05 g phosphorous acid, the copolyester is discharged, cooled and granulated.

50 g of the polyester described above are melted at 200° C. and subsequently 1 g hexamethylene diisocyanate is added with stirring.

A white, flexible material with a weight average molecular weight of 232300 g/mole and a melting point of 107° C. is obtained.

Films of this material produced by compression moulding of the melt typically exhibit tensile strength values of 16 N/mm$^2$ and an elongation at break of 600%.

EXAMPLE 3

Examination of the Biodegradability

In the table below, the results of tests on the materials according to the invention for biodegradability with pre-screened microorganism consortia and ripened compost are summarised.

| Test method | Polymer according to example 1 | Polymer according to example 2 | Non-chain-extended BTA |
|---|---|---|---|
| Compost test (a) (weight loss in %) | | | |
| after 4 weeks | 38 ± 13 | 31 ± 5 | — |
| after 8 weeks | 78 ± 7 | 71 ± 11 | — |
| Clear zone test (zone diameter in mm after 7 days) | 15 | 14 | — |
| Film/plate test mineral medium organisms 2/5 (weight loss in % after 9 days) | 28 | 21 | 17 |
| Film/plate test compost eluate medium organisms 2/5 (weight loss in % after 9 days) | 39 | 50 | 56 |
| Film/plate test mineral medium organisms K1 (weight loss in % after 20 days) | 4 | 5 | 9 |
| Film/plate test mineral medium organisms K2 (weight loss in % after 20 days) | 32 | 26 | 17 |
| Film/plate test mineral medium organisms 2/5 (weight loss in % after 20 days) | No further film fragments to be isolated | | | a: mean of 3 measurements

EXAMPLE 4

Processing into Blown Film

| Equipment: | Dr. Collin laboratory blown film facility with small extruder Y30 mm × 25 D | |
|---|---|---|
| | 3-zone screw with shearing and mixing section | |
| | Compression ratio: | 1:3 |
| | Annular die diameter: | 80 mm |
| | Die gap width: | 0.8 mm |
| | Distance between die and nip rolls | 1.5 m |
| Processing parameters: | Screw: | 200–255° C. |
| | Screen changer: | 210° C. |
| | Adapter: | 210° C. |
| | Die: | 210° C. |
| | Melt temperature: | 230° C. |
| | Melt pressure: | 360 bar |
| | Screw speed: | 25 min$^{-1}$ |

Granules from example 1 with an MFI (190/21.5) of 3.75 g/10 minutes are processed at a take-off speed of 2–3 m/min and with a blow-up ratio of 1:2 on the facility described above to form blown films. The films thus obtained exhibit properties comparable with LDPE as regards transparency and strength but a much higher extensibility.

SUMMARY

The invention relates to biodegradable polyesters which are degraded in a natural environment under the influence of microorganisms and which are high molecular random copolyesters produced by means of an aliphatic polyol, an aromatic polycarboxylic acid and, simultaneously, an aliphatic polycarboxylic acid as monomer components and exhibit constitutional repeating units or recurring units which consist (i) on the one hand, of polyol and aromatic polycarboxylic acid and (ii) on the other hand, of polyol and aliphatic polycarboxylic acid more than 90% of the units according to (i) being directly coupled with no or with a maximum of one further unit according to (i), characterised in that (i) polyol, aromatic polycarboxylic acid and aliphatic polycarboxylic acid are condensed in the melt to a preliminary product and subsequently (ii) the preliminary product is condensed with the diisocyanate as additional monomer component to form the end product, the diisocyanate being used in a smaller quantity compared with that of each of the other monomer components.

The invention also relates to materials consisting of a biodegradable polyester according to the invention and a method of production for polyesters according to the invention.

What is claimed is:

1. A biodegradable polyester which is degradable in a natural environment under the influence of microorganisms, said polyester comprising a high molecular weight random copolyester prepared from monomer components comprising (a) an aliphatic polyol, (b) an aromatic polycarboxylic acid or condensable derivative thereof, and (c) an aliphatic polycarboxylic acid or condensable derivative thereof, said polyester containing repeating units which comprise
   (i) first repeating units containing polyol and aromatic polycarboxylic acid residues and
   (ii) second repeating units containing polyol and aliphatic polycarboxylic acid residues,
more than 90% of the units according to (i) being directly coupled to at most one further unit (i), wherein the biodegradable polyesters have a molecular weight of 60,000 to 350,000 g/mole and are produced using one or more diisocyanates as an additional monomer component, said diisocyanate(s) being used in a smaller quantity by weight compared with that of any of the other monomer components (a), (b), or (c).

2. The polyester of claim 1, wherein the diisocyanate is used in quantities of 0.1 to 5% by weight based on the weight of said polyester.

3. The polyester of claim 1 wherein the diisocyanate is used in quantities of 0.5% to 2% by weight based on the weight of said polyester.

4. The polyester of claim 1 wherein said diisocyanates are selected from the group consisting of aliphatic diisocyanates, cycloaliphatic diisocyanates, aromatic diisocyanates, and mixtures thereof.

5. The polyester of claim 1 wherein said diisocyanate comprises hexamethylene diisocyanate.

6. The polyester of claim 1 wherein said polyester has a content of aromatic polycarboxylic acid of 3 to 65 mole percent based on the total acid in the form of monomer components.

7. The polyester of claim 1 wherein said polyester has a content of aromatic polycarboxylic acid of 3 to 65 mole percent based on the total acid in the monomer components.

8. The polyester of claim 1 wherein said polyester has a content of aromatic polycarboxylic acid of 35 to 55 mole percent based on the total acid in the monomer components.

9. The polyester of claim 1 wherein said polyester is condensed from
   a) one or more $C_{2-6}$ aliphatic diols;
   b) one or more aromatic dicarboxylic acids;
   c) one or more $C_{2-10}$ aliphatic dicarboxylic acids; and
   d) one or more diisocyanates.

10. The polyester of claim 9 wherein said one or more aliphatic diols are selected from the group consisting of 1,2-ethane diol, 1,2-propane diol, 1,3-propane diol, 1,4-butane diol, 2,3-butane diol, 2,3-butane diol, and 1,6-hexane diol.

11. The polyester of claim 9 wherein said aromatic dicarboxylic acid comprises terephthalic acid.

12. The polyester of claim 9 wherein said one or more aliphatic dicarboxylic acids are selected from the group consisting of adipic acid and sebacic acid.

13. The polyester of claim 1 wherein said polyester is condensed from aromatic dicarboxylic acid methyl esters and aliphatic dicarboxylic acid methyl esters.

14. The polyester of claim 1, wherein a polyester intermediate product is condensed from a melt of polyol, aromatic dicarboxylic acid or condensable residue thereof, and aliphatic dicarboxylic acid or condensable derivative thereof, and subsequently condensed with one or more diisocyanates to form said biodegradable polyester.

15. The polyester of claim 14 wherein excess polyol is employed in said melt.

16. The polyester of claim 14 wherein said diisocyanate is added to the melt.

17. The polyester of claim 14 wherein said melt and said diisocyanate are introduced into a separate reactor and condensed therein.

18. The polyester of claim 14 wherein said polyester intermediate product has a molecular weight of between 5,000 and 60,000 g/mol.

19. The polyester of claim 14 wherein said polyester intermediate product has a molecular weight of between 5,000 and 50,000 g/mol.

20. The polyester of claim 14 wherein said biodegradable polyester has a molecular weight of 100,000 to 250,000 g/mol.

21. The polyester of claim 1 wherein said polyester has a melting point in the range of 40° C. to 155° C.

22. The polyester of claim 1 wherein said polyester has a melting point in the range of 90° C. to 155° C.

23. The polyester of claim 1 in a form selected from the group consisting of films, composite materials, laminates, single filaments, and molded parts.

24. A refuse bag comprising a film of the polyester of claim 1.

25. The polyester of claim 9 wherein the mechanical strength of said polyester is increased by stretching said polyester at a temperature below the melting point of said polyester.

26. The polyester of claim 1 further comprising an inorganic or organic filler which does not negatively affect biodegradability.

27. The polyester of claim 26 wherein said filler is selected from the group consisting of silica, silica gel, titanium dioxide, talcum, starch, cellulose, or mixtures thereof.

28. A process for the preparation of the biodegradable polyester of claim 1, said process comprising reacting
   a) one or more aliphatic polyols,
   b) one or more aromatic dicarboxylic acids or condensable derivatives thereof,
   c) one or more aliphatic dicarboxylic acids or condensable derivatives thereof, and
   d) simultaneously or sequentially reacting therewith one or more diisocyanates, the amount of diisocyanate(s) being less on a weight basis than any of a), b), or c);
such that a polyester having first repeating units derived from said polyol and said aromatic polycarboxylic acid or condensable derivative thereof, and second repeating units derived from said polyol and said aliphatic dicarboxylic acid or condensable derivative thereof, more than 90% of said first repeating units being coupled to not more than one other of said first repeating unit, is produced.

29. The process of claim 28 wherein components a), b) and c) are reacted together in the melt, and subsequently reacted with component d).

* * * * *